O. E. MAYNARD.
GLASS DRAWING AND TAKE-DOWN APPARATUS.
APPLICATION FILED NOV. 4, 1905.
1,073,613.
Patented Sept. 23, 1913.
3 SHEETS—SHEET 1.
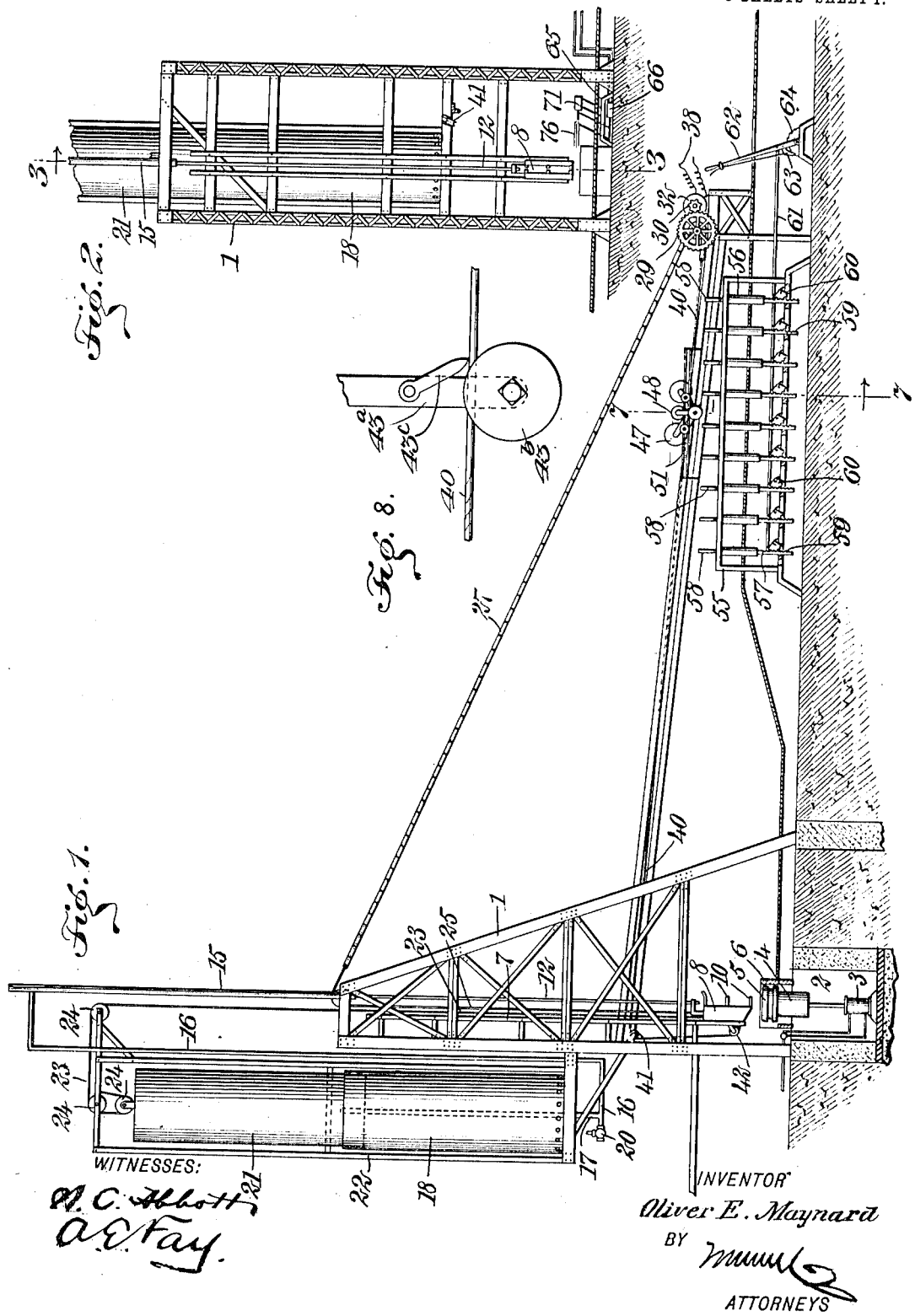
WITNESSES:
A. C. Abbott
A. E. Fay
INVENTOR
Oliver E. Maynard
BY
ATTORNEYS

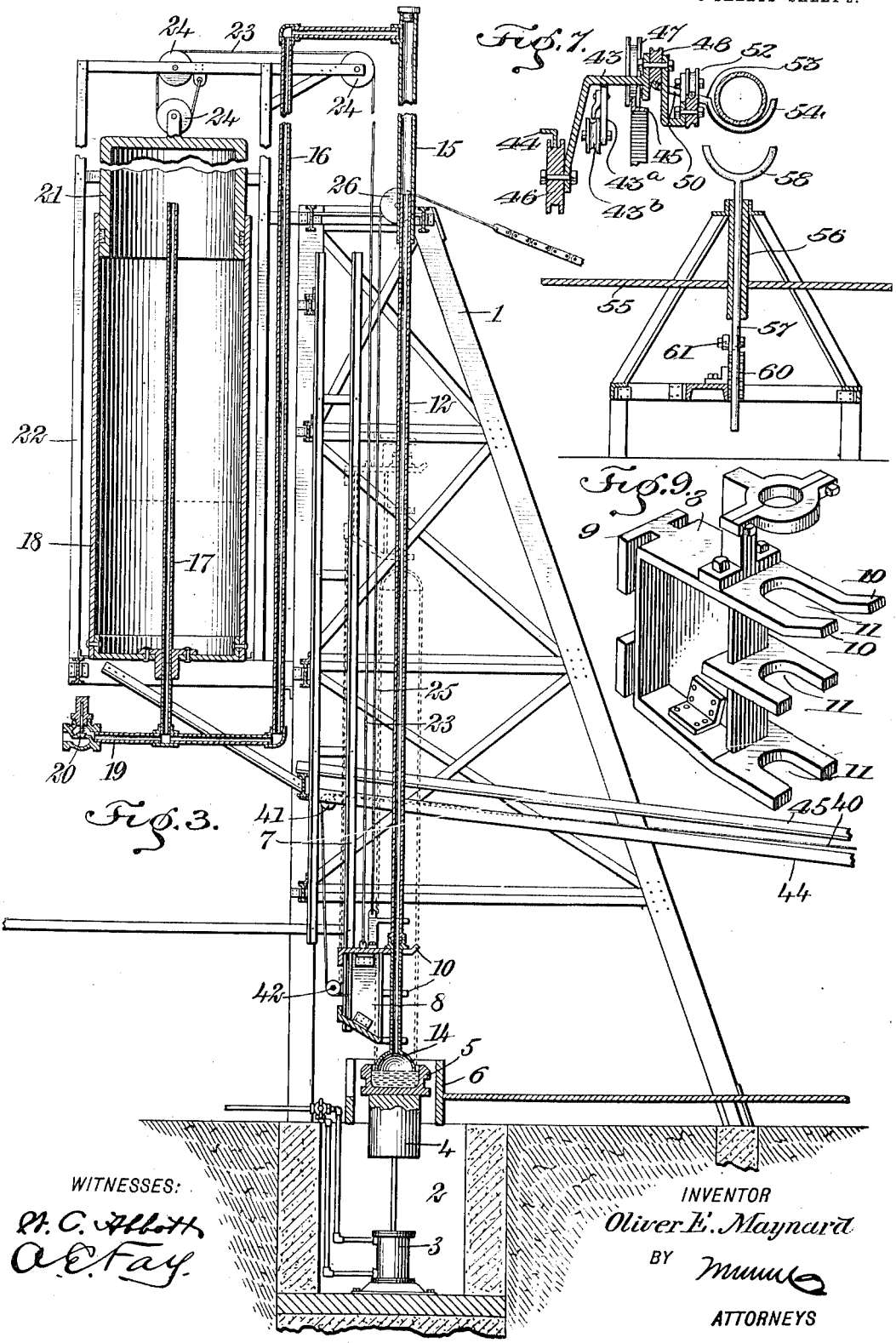

O. E. MAYNARD.
GLASS DRAWING AND TAKE-DOWN APPARATUS.
APPLICATION FILED NOV. 4, 1905.
1,073,613.
Patented Sept. 23, 1913.
3 SHEETS—SHEET 3.
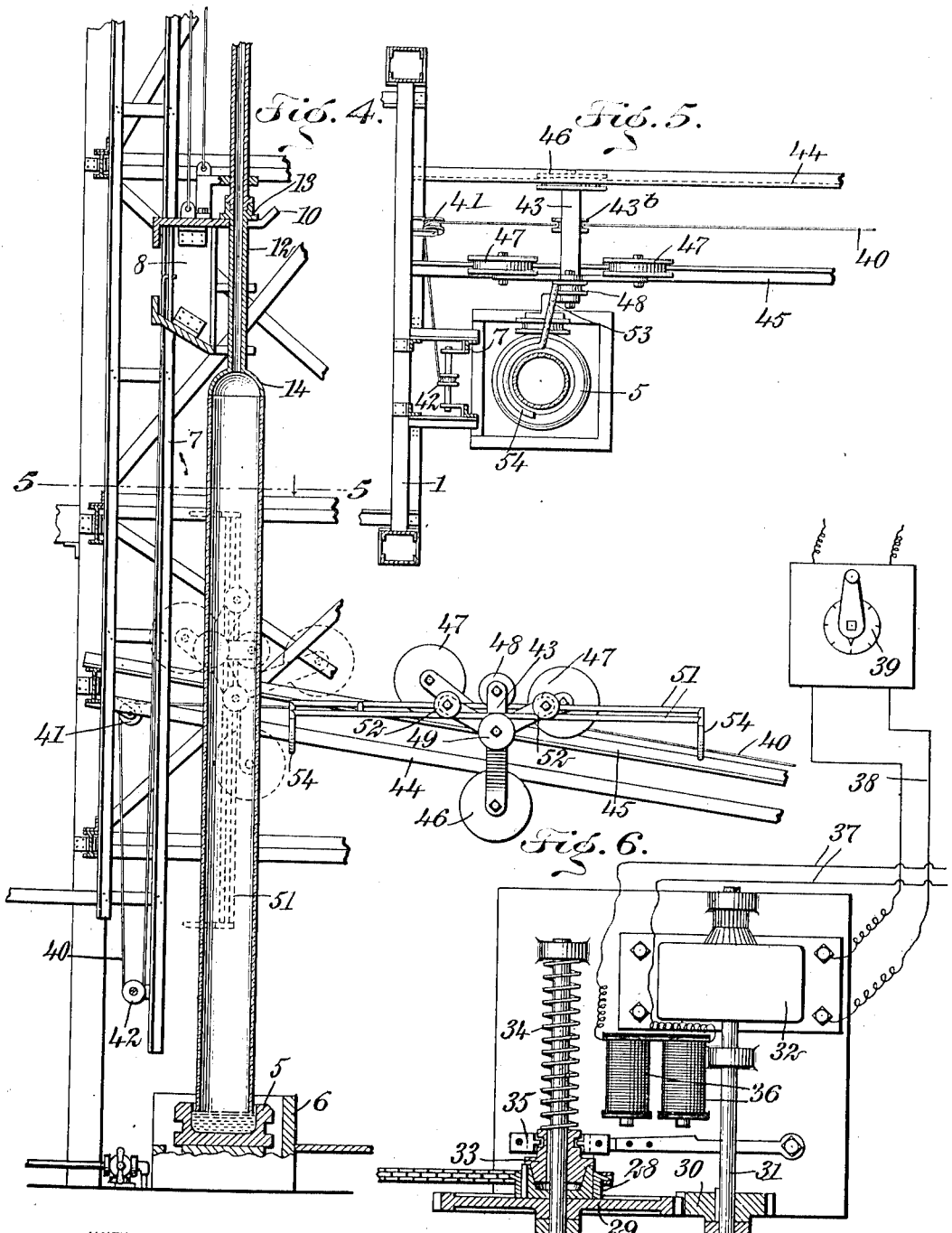
WITNESSES:
INVENTOR
Oliver E. Maynard
BY
ATTORNEYS

UNITED STATES PATENT OFFICE.

OLIVER E. MAYNARD, OF KANE, PENNSYLVANIA, ASSIGNOR TO THE WINDOW GLASS MACHINE COMPANY, OF PITTSBURGH, PENNSYLVANIA, A CORPORATION OF NEW JERSEY.

GLASS-DRAWING AND TAKE-DOWN APPARATUS.

1,073,613.   Specification of Letters Patent.   Patented Sept. 23, 1913.

Application filed November 4, 1905. Serial No. 285,853.

*To all whom it may concern:*

Be it known that I, OLIVER E. MAYNARD, a citizen of the United States, and a resident of Kane, in the county of McKean, State of Pennsylvania, have invented certain new and useful Improvements in Glass-Drawing and Take-Down Apparatus, of which the following is a full, clear, and exact description, reference being had to the accompanying drawings, in which—

Figure 1 is a side elevation of one form of apparatus embodying my invention. Fig. 2 is an end elevation of a portion of the same. Fig. 3 is a vertical section taken on the line 3—3 of Fig. 2. Fig. 4 is a sectional view taken on the same line as Fig. 3, but with certain parts omitted and with other of the parts in a different position. Fig. 5 is a section on the line 5—5 of Fig. 4. Fig. 6 is a view partly in plan and partly in section of an operating device. Fig. 7 is a section on the line 7—7 of Fig. 1, Fig. 8 is a detail view hereinafter referred to, and Fig. 9 is a perspective view of the elevator cage.

My invention has relation to glass drawing and take-down apparatus, the object being to provide, in combination with glass drawing apparatus, means of simple and effective character for engaging the drawn article and placing it upon a suitable support.

To this end, my invention consists in the combination with glass drawing apparatus having mechanism for intermittently drawing glass articles, of a take-down apparatus which is movable toward and from the drawn article and which is arranged to engage the same between the bait of the drawing apparatus and the glass holding receptacle and remove the same into the desired position.

The nature of my invention will be best understood by reference to the accompanying drawings, in which I have shown one embodiment thereof, and which will now be described, it being premised, however, that various changes may be made in the details of construction and arrangement of the parts without departing from the spirit and scope of my invention as defined in the appended claims.

In these drawings, the numeral 1 designates a suitable supporting frame-work which is built above a pit 2, in which is located an air-jack or other suitable lifting device 3.

4 is a clay block carried by the lifting device and which supports a glass pot or receptacle 5, the jack being arranged to raise and lower the block 4, so as to bring the pot 5 into the proper position for drawing.

6 designates a wall forming a kiln for keeping the pot heated.

The frame-work 1 is provided with suitable ways 7, upon which is mounted a vertical movable drawing cage 8. This cage is provided with suitable guides 9 (see Fig. 9) which are adapted to engage the ways 7 during the vertical movements of the cage. It is also shown as having a series of fork like projections 10 (see Fig. 9), the openings 11 between the prongs of the forks being adapted to receive a blow pipe or bait stem 12. This stem is preferably provided with an enlargement or collar 13, for the purpose of supporting it on the upper of the three forks 10. At its lower end it is provided with a bait 14, which is adapted to be lowered into the glass pot 5 in the usual manner in drawing glass articles.

The blow pipe or stem 12 is telescopically connected with a pipe or tube 15, which is fixedly supported on the upper portion of the frame 1. In the drawings I have shown this pipe 15 as being connected by pipes 16 and 17 with the lower end of a cylinder 18, which is designed to hold air or gas under pressure, this air or gas constituting a blowing medium for the cylinder. The necessary blowing medium may, however, be provided in any suitable or well-known manner. The pipe 16 is shown as having an extension 19 which also communicates with the pipe 17, and this extension has a valve 20 which opens in one direction to permit air to be forced into the cylinder when the pressure within the latter is less than the atmospheric pressure. The cylinder is provided with a telescoping piston section 21, which is fixedly mounted on a frame 22 connected with the main frame 1; while the piston section 21 is reciprocatingly mounted thereon and is designed to reciprocate with the drawing cage, but to move in the opposite direction to the cage. For this purpose the cylinder 21 and the cage are connected by a chain or cable 23, which passes over pulleys 24, being fixed at one end of the frame 22. The cage is provided with a flexible connection 25 passing upwardly over a pulley 26 and connected with a sprocket chain 27. This chain passes around a sprocket wheel 28 which actuates the chain. This sprocket wheel is connected with a gear 29, which, in turn, meshes with a gear or pinion 30 on a shaft 31, operated by a motor 32, as shown in Fig. 6. A clutch 33 is provided for controlling the connection between the sprocket 28 and the gear 29. This clutch is normally forced into locking position by means of a spring 34 and can be pulled out of that position by a lever 35 which is controlled by one or more electro-magnets 36. The magnets are operated by an electric circuit 37; and the motor by a circuit 38, the latter having a controller 39. The chain 27 passes around the sprocket wheel 28 and is connected at its opposite end with a flexible connection 40. The latter passes over a pulley 41 on the frame 1 and around the pulley 42, which is preferably journaled on one of the guides 7. This pulley 42 is located below the lowermost position of the drawing cage; and the connection 40 after passing around said pulley, is secured at its end to the said cage.

The operation of the motor will cause the cage to either rise or fall. The connection 40 is also arranged to operate a traveling carriage 43, which is mounted to run on an inclined track. This track is shown as consisting of the two rails 44 and 45 at different elevations, the carriage 43 having flanged wheels 46 and 47 which run under the track 44 and over the track 45, respectively. The carriage also carries a plurality of sheaves 48 and 49, the sheave 48 being located above the sheave 49 and at the rear of it.

The carriage 43 has mounted thereon a frame 50, which is provided with parallel rails 51, one located in front of the other, one of the rails running under the sheave 48 and the other over the sheave 49. The carriage 43 also has sheaves 52 located above the front rails 51 and in line with the sheave 49, whereby the rail which passes between these sheaves and the sheave 49 will be secured in position between them. The frame 50 has projecting arms 53 provided with rests 54 for receiving the drawn glass cylinder. The carriage is also provided with a frame 43$^a$ on which is mounted a sheave 43$^b$ and a pivoted finger 43$^c$ (see Fig. 8). When the finger 43$^c$ is in the position shown in Fig. 8, the cable 40 can pass in either direction without moving the carriage; but when the parts are moved to the left, the cable is clamped between the sheave 43$^b$ and the finger 43$^c$ and the carriage will be moved with the cable. The movement of the cable 40 in one direction will automatically operate this clamp.

When the cylinder is ready to be cut off and taken down, the operator moves the take-down carriage 43 up the inclined track, and when the carriage is at the upper portion of the track he tips it into such position that the rails 51 are in the vertical position shown in dotted lines in Fig. 4. At this time the rests 54 engage the cylinder of glass so that when tipped back they support it down the inclined plane, the stem 12 being disengaged from the pipe and forks 10. As the endless flexible connection above described moves longitudinally when the cylinder has been cut loose, it operates the finger 43$^c$ and moves the carriage and the frame supported by it down the inclined tracks until the carriage reaches a position at the lower end of the track.

The take-down device is designed to transfer the cylinder of glass from the position in which it is made, to what is called the capping-off horse. In the drawings I have shown this horse (see Fig. 1) as consisting of a frame 55, provided with a series of vertical guides 56 carrying sliding rods 57. Each rod 57 is provided with a rest 58 at the upper end thereof, and also has a rack 59 meshing with the segmental gear 60. Each of these gears is connected with an actuating rod 61, whereby all the gears may be turned upon their pivots at the same time by a longitudinal movement of the rod. To effect this movement of the rod, it may be provided with an operating handle 62 having the usual pawl and rack holding devices 63 and 64. When the glass cylinder is suspended over the rests 58, the handle 62 is operated to raise the rests so that they are moved upwardly into engagement with the cylinder and thus lift the same from the rests 54. The latter can then be withdrawn and the cylinder lowered.

In the drawing operation, a blow pipe or bait stem 12 is heated and placed in position with respect to the cage, its telescopic part being properly fitted so as to prevent the escape of air. The clutch 33 is then released and the bait is lowered into the glass. The motor 32 is then started so as to draw the cage and pipe upwardly. As the cage ascends, the piston of the air cylinder is lowered, thus forcing air through the pipes 17, 16, 15 and 12 into the interior of the glass cylinder which is being drawn. The motor 32 is preferably started at a slow rate of speed, which is gradually increased by means of the controller 39. When the cage has attained the proper height to give the cylinder the desired length, the take-down carriage is run up behind the cylinder in the manner before described. When the motor 32 is stopped and the clutch 33 released by the operation of the circuit 37 and the magnets 36, the sprocket wheel 28 becomes an idler. The drawing cage will then start down by force of gravity, drawing up the piston or section 21 so as to fill the cylinder 18 with air. The clutch shown in Fig. 8 is then freed from the cable between the rails 44 and 45; and the take-down carriage 43 runs along the track toward the motor and carries the cylinder with it. A suitable device may be employed for severing the connection between the articles and the glass in the pot adjacent to the drawing point.

The advantages of my invention result from the provision of means whereby the machine itself can be made to take down the cylinders, thus largely dispensing with hand operation to perform these steps.

As before stated, I do not limit myself to the construction and arrangement of the parts, as herein shown and described, thus any suitable means may be provided for supplying the cylinder with air while it is being drawn; the construction of the drawing carriage may be of any usual or suitable character capable of supporting the blow pipe in the manner described, so that the latter can be disengaged from its connecting pipe in the taking-down operation; the manner of operating the take-down carriage, together with the details of construction thereof may be varied and any suitable capping off parts may be employed.

What I claim is:

1. In glass-drawing apparatus, a glass-holding receptacle, glass-drawing mechanism arranged to be moved toward and from the receptacle to draw the glass intermittently therefrom, said mechanism having a bait, a support arranged to receive the drawn article and take-down apparatus movable toward and from the article and arranged to engage the article below the bait, said take-down apparatus being arranged to tilt the article.

2. In glass-drawing apparatus, a glass-holding receptacle, mechanism arranged to draw glass intermittently therefrom and having a removable bait, a track or support extending to a point adjacent to the drawing path, and a take-down device movable on said support and arranged to engage the glass article below the bait.

3. In glass-drawing apparatus, a glass-holding receptacle, mechanism for drawing glass therefrom, a horse or support arranged to receive the glass article, and take-down apparatus movable between the drawing apparatus and the horse.

4. In glass-drawing apparatus, a glass-holding receptacle, drawing mechanism arranged to intermittently draw glass articles therefrom, a horse or support for the articles arranged to receive the same in substantially horizontal position, and take-down apparatus movable between the drawing position and the horse and arranged to tilt the glass and deposit it on the horse.

5. In glass-drawing apparatus, a glass-holding receptacle, mechanism for drawing glass therefrom, a support or horse at one side of the drawing apparatus, a track extending between the drawing apparatus and the horse, and a take-down apparatus movable with said track or support.

6. In glass-drawing apparatus, the combination with a drawing device, of an outwardly and downwardly inclined track leading therefrom, and take-down apparatus movable on said track.

7. In glass-drawing apparatus, the combination with a drawing device, of an outwardly and downwardly inclined track leading therefrom, and take-down apparatus movable on said track, said take-down apparatus being arranged to tilt the glass article into a substantially horizontal position.

8. A machine for making hollow glass articles, comprising a movable bait, a tube connected therewith, means for forcing air into the tube when the bait is raised, a conveyer, and means connected with the bait for moving the conveyer.

9. A machine for making hollow glass articles, comprising a movable bait, a tube connection therewith, means for forcing air through the tube, a conveyer adapted to move into position adjacent to said bait, and means for simultaneously moving the tube and the conveyer.

10. A machine for making hollow glass articles, comprising a movable bait, a tube connected therewith, means for forcing air through the tube, a conveyer adapted to move into position adjacent to said bait, and means for simultaneously moving the tube and the conveyer, said means comprising a chain connected with the tube and with the conveyer, a sprocket-wheel for operating said chain, a motor, and connections between the motor and sprocket-wheel.

11. A machine for making glass articles, comprising a bait tube, a conveyer adapted to move into a position adjacent to said tube, and means for simultaneously moving the tube and conveyer, said means comprising a connection between the tube and the conveyer, a motor, means connected with the motor for operating said connection, a clutch, means for normally forcing said clutch into operative position to connect the motor with said connection, and electromagnets for withdrawing the clutch from operative position.

12. A machine for making hollow glass articles, comprising a movable bait, a tube connected therewith, means for forcing air through the tube, a conveyer adapted to move into position adjacent to said bait, and means for simultaneously moving the tube and the conveyer, said means comprising a chain connected with the tube and with the conveyer, a sprocket-wheel for operating said chain, a motor, connections between the motor and sprocket-wheel, a clutch mounted to engage with said sprocket-wheel, means for normally forcing said clutch into operative position, and electromagnets for withdrawing the clutch from the sprocket-wheel, whereby the sprocket-wheel can be left free to rotate.

13. A machine for drawing hollow glass articles, comprising a movable bait, a tube connected with the bait, a track, a carriage on said track, said carriage having means for supporting an article formed by the machine, and means for simultaneously moving the bait and said carriage.

14. A glass-making machine comprising means for producing a glass article, an inclined track located adjacent to said means, a carriage on said track, said carriage being provided with extending arms having curved portions at opposite ends of the carriage, means for moving said carriage up the track toward the first-named means, and means for releasing the carriage from the last-named means and permitting it to descend along the track by gravity.

15. A glass-making machine, comprising a track, a carriage mounted thereon, a series of flanged sheaves upon said carriage, and a frame mounted on said sheaves and adapted to be moved along therewith, said frame being provided with projecting arms supporting glass articles.

16. A glass-making machine, comprising a track, a carriage thereon, means for moving said carriage along the track comprising a flexible member, and means on the carriage for gripping said flexible member, comprising a movable sheave and a finger located adjacent to said sheave.

17. A glass-making machine, comprising an inclined track, a carriage located on said track, means for moving the carriage up the track comprising a flexible member passing under the carriage, and means on the carriage for engaging said flexible member and gripping it; said means comprising a pivoted frame, a sheave on the frame, and a finger fixedly mounted on the frame and adapted to grip the flexible member when the frame is swung into a certain position, whereby the frame can be moved up the track by power applied to said flexible member, and can be released from said flexible member to descend along the track by gravity.

18. A glass-making machine, comprising an inclined track, a carriage mounted thereon, a series of flanged sheaves upon said carriage, a frame mounted on said sheaves and adapted to be moved along them, said frame being provided with projecting arms for supporting glass articles, a capping-off horse located adjacent to the lower end of said track, and means connected with said horse for removing a glass article from said carriage.

19. A glass-making machine, comprising an inclined track, means thereon for conveying the product of the machine down the track, and a capping-off horse located adjacent to the lower end of the track, said horse comprising a plurality of rests each capable of vertical movements and means for simultaneously raising and lowering said rests.

20. In glass-drawing apparatus, the combination with a drawing device, of a support adjacent thereto, a take-down carriage movable along the support and having grippers to engage the drawn glass article, and connections for moving the same along the track.

21. In glass-drawing apparatus, the combination with a drawing device, of a support extending adjacent thereto, a tilting take-down carriage movable along the support and having grippers to engage the drawn glass article, and connections for moving the same along the track.

22. In a take-down device for glass cylinders, an inclined track, a drawing device, a carriage movable on the track, and a connection between the carriage and the drawing device.

In testimony whereof I have signed my name to this specification in the presence of two subscribing witnesses.

OLIVER E. MAYNARD.

Witnesses:
 Ed. Andersen,
 Geo. M. Klingar.